No. 748,366. PATENTED DEC. 29, 1903.
C. P. P. GRAVÉ & J. SCHAIBLE.
FLOUR SIFTING MACHINE.
APPLICATION FILED JUNE 25, 1903.
NO MODEL. 3 SHEETS—SHEET 1.

Witnesses:
H. B. Hallock
L. H. Morrison

Inventors
Carl P. P. Gravé
John Schaible
By

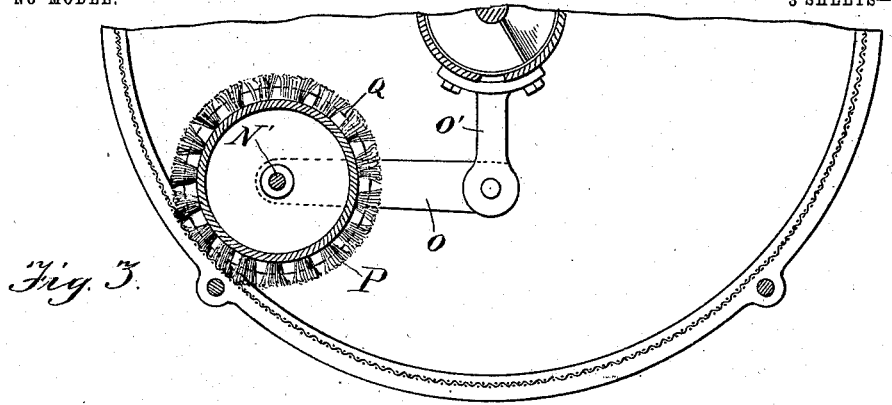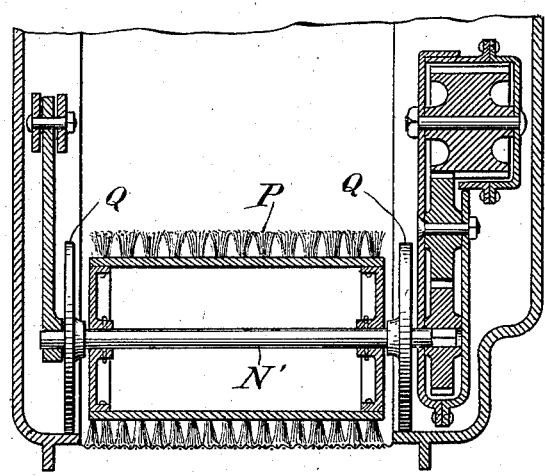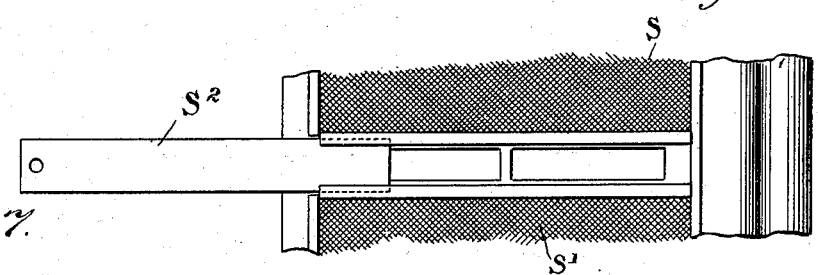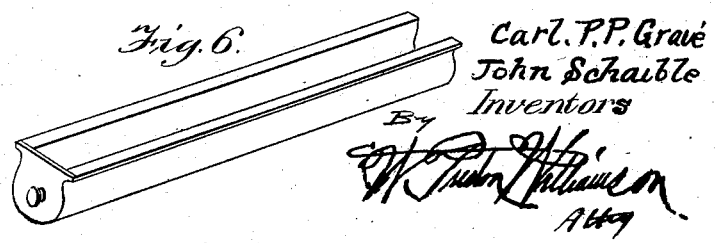

No. 748,366. PATENTED DEC. 29, 1903.
C. P. P. GRAVÉ & J. SCHAIBLE.
FLOUR SIFTING MACHINE.
APPLICATION FILED JUNE 25, 1903.
NO MODEL. 3 SHEETS—SHEET 3.

Witnesses:

Carl P. P. Gravé
John Schaible
Inventors

No. 748,366. Patented December 29, 1903.

UNITED STATES PATENT OFFICE.

CARL P. P. GRAVÉ AND JOHN SCHAIBLE, OF EASTON, PENNSYLVANIA.

FLOUR-SIFTING MACHINE.

SPECIFICATION forming part of Letters Patent No. 748,366, dated December 29, 1903.

Application filed June 25, 1903. Serial No. 163,062. (No model.)

*To all whom it may concern:*

Be it known that we, CARL P. P. GRAVÉ and JOHN SCHAIBLE, citizens of the United States, residing at Easton, county of Northampton, and State of Pennsylvania, have invented a certain new and useful Improvement in Flour-Sifting Machines, of which the following is a specification.

Our invention relates to a new and useful improvement in flour-sifting machines, and has for its object to provide a flour-sifter which will operate upon the centrifugal principle and sift and purify the flour, the flour being fed to the interior of the machine by means of a screw conveyer.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1:
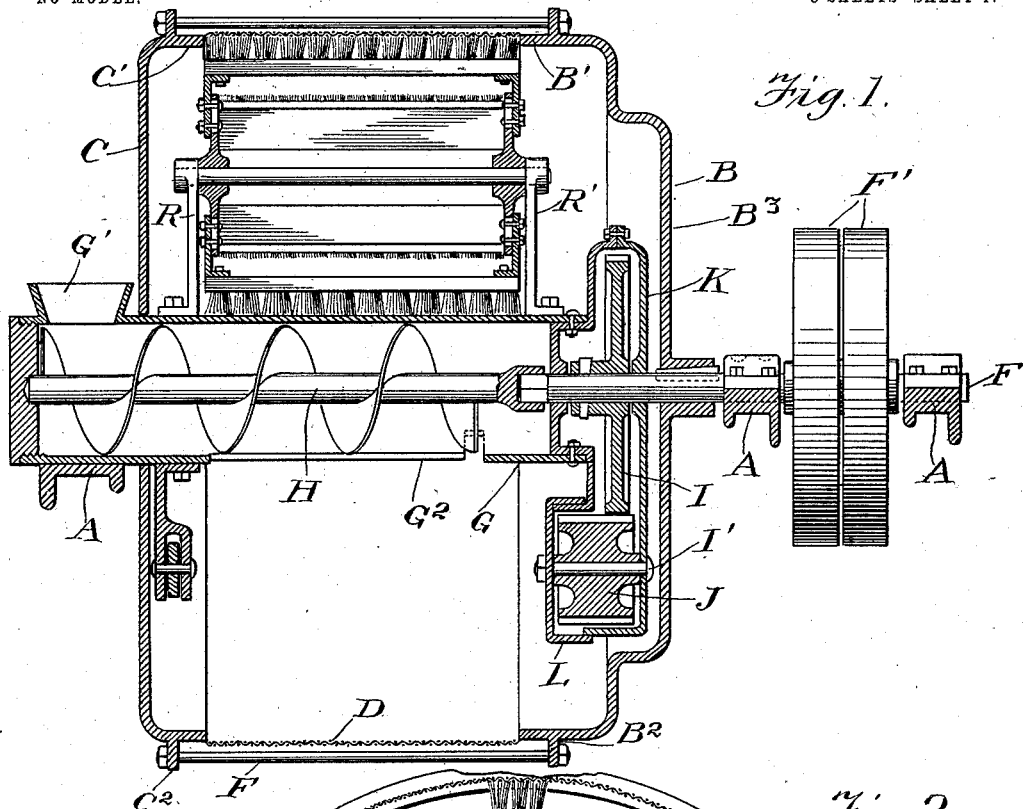
Figure 2:
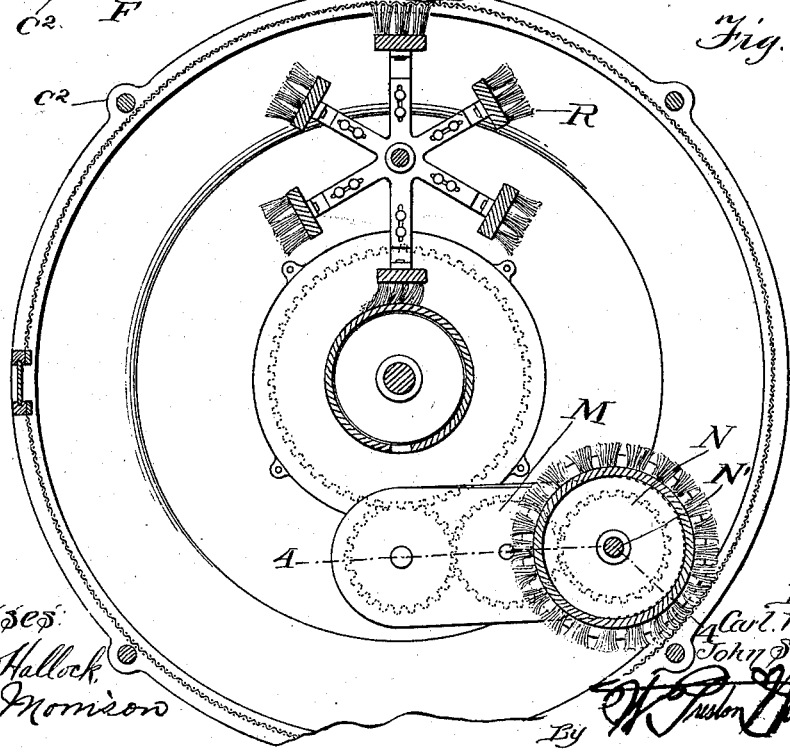
Figure 8:
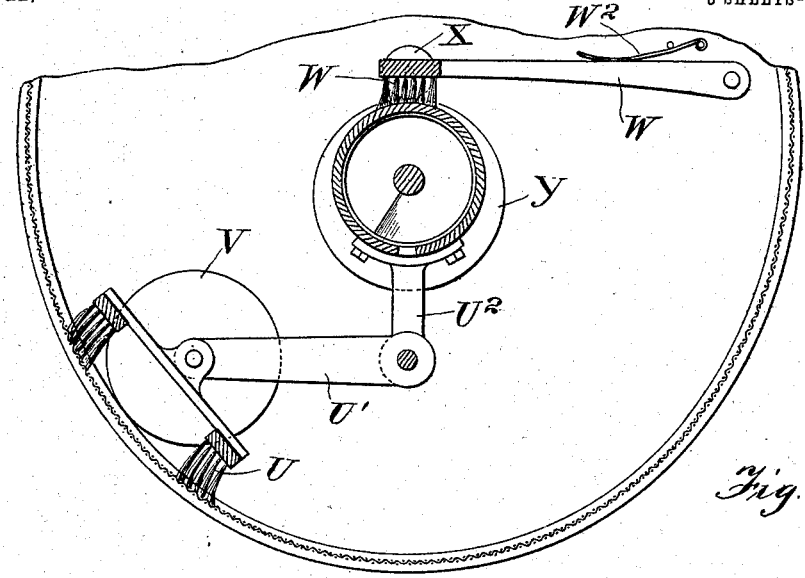
Figure 9:
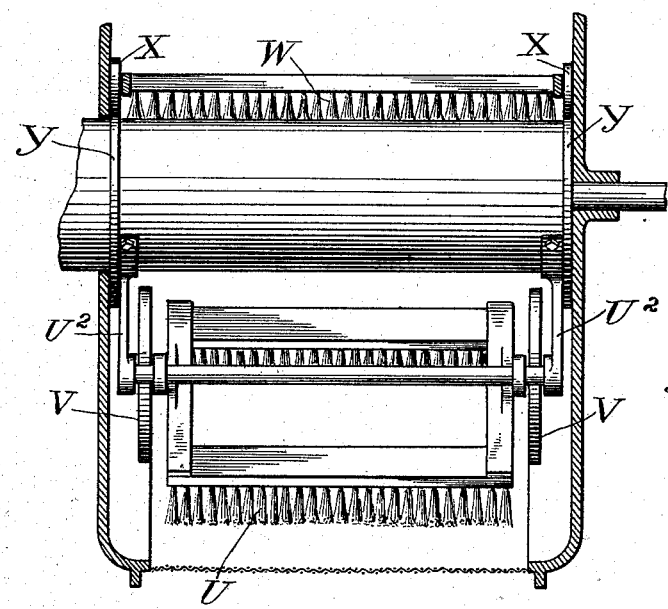

Figure 1 is a vertical longitudinal section through the sifter. Fig. 2 is a transverse vertical section through the machine; Fig. 3, a transverse vertical section of the lower portion of the machine looking in the opposite direction from Fig. 2; Fig. 4, a section taken on the line 4 4 of Fig. 2; Fig. 5, an outside elevation of a portion of the machine, showing the opening through the screen; Fig. 6, a perspective view of a trough adapted to be attached underneath the opening to receive the refuse when the machine is cleaned; Fig. 7, a cross-sectional view showing the trough or receiver attached to the machine; Fig. 8, a transverse vertical section of the lower portion of the machine, showing a modified form of construction; Fig. 9, a vertical longitudinal section of Fig. 8.

A represents the framework, which may be of any suitable design for supporting the machine.

The rotary portion of the machine consists of two end disks B and C, the periphery of said disks being turned in toward one another horizontally, so as to form flanges B' and C'.

$C^2$ and $B^2$ are annular flanges extending vertically from the horizontal flanges C' and B'.

D is the screen, which is cylindrical in shape and fits over the flanges C' and B' and in between the flanges $C^2$ and $B^2$. Long bolts or threaded rods E pass between the flanges $C^2$ and $B^2$ and bind the two disks together and the screen in place.

F is the power-shaft, journaled in suitable bearings upon the framework and provided with fast and loose pulleys F' for driving the same. This power-shaft extends to the interior of the machine through the disk B, and said disk is keyed to the shaft, so as to revolve therewith.

G is a feed-tube extending into the center of the machine through the disk C, and this feed-tube is secured rigidly to the frame A, and located within the tube is a screw conveyer H, which is removably connected at its inner end to the shaft F, so as to revolve therewith. The tube G extends outside of the disk C and is provided upon its outer end with a hopper G', into which the flour to be sifted is fed. Upon the interior of the machine and at its lowest point the tube G is provided with the slot $G^2$, through which the flour falls into the interior of the machine.

Secured to the shaft F just inside of the disk B is a gear-wheel I, and located directly below this gear-wheel is a gear J in mesh with the gear-wheel I.

K is a casing or housing surrounding the gear-wheel I and a portion of the gear-wheel J. This casing K is secured to the inner end of the feed-tube G, as shown in Fig. 1, and therefore is stationary.

L is a casing surrounding the lower end of the casing K and making a dust-tight joint with the same. A bolt L' passes through the back of the casing K, through the gear J, and through the casing L, thus forming a shaft for the gear J and binding the two casings together, but allowing the casing L to rock upon the pivot L'.

M is a gear journaled in the casing L and in mesh with the gear J. N is another gear-wheel journaled upon a shaft N' and located in the other end of the casing L. The shaft N' is journaled at one end also in the casing L, and therefore the gear-wheels M and N and shaft N' may rock with said casing. The other end of the shaft N' is journaled in one end of a link O upon the opposite end of the machine, and the other end of this link O is pivoted to the lower end of a hanger O', secured to and depending from the feed-tube G. The point where the link O is pivoted to the hanger O' is in alinement with the pivotal point of the casing L, and therefore the shaft N' will have a parallel movement as it rocks.

Secured upon the shaft N' and adapted to revolve therewith is a rotary brush P, which is slightly less in length than the distance between the flanges C' and B', and therefore this brush rests upon the screen D and through the train of gears will be caused to revolve in an opposite direction to the screen.

Q represents rollers or wheels journaled loosely upon the shaft N' and adapted to roll upon the flanges C' and B' for the purpose of preventing the brush P from coming in too harsh a contact with the screen. These rollers or wheels Q can be removed and larger or smaller ones inserted, so as to adjust the brush to the screen.

It will thus be seen that the flour dropping through the slot $G^2$ of the feed-tube will drop upon the screen and be sifted by the centrifugal motion, and the brush P will aid in forcing the flour through the screen and keeping the screen-meshes open. By using centrifugal force for sifting flour air is forced through the screen and through the flour, therefore purifying the same.

Of course it is understood that the casing incloses the machine, so as to confine the sifted flour; but this is common to all flour-sifters, and therefore it has not been shown.

The disk B is provided with an offset or recess $B^3$ for the accommodation of the gearing.

While we have illustrated in Figs. 1, 2, and 3 the disks as being made circular, it is obvious that they could be made oval or egg shape, if desired, as the brush P would follow the screen and accommodate itself to other forms than the circular form.

To prevent the flour from lodging upon the feed-tube G, we provide the rotary brush R, which is journaled in suitable bearings R', extending upward from the tube G, and the upper portion of this brush is adapted to come in contact with the revolving screen, and therefore revolve the brush, so that the lower portion of the brush will sweep off any flour lodging upon the tube. This brush may be made adjustable, so as to adjust it between the screen and the tube as the bristles wear.

S is a frame to which each end of the screen is attached, and through this frame is provided openings S', communicating with the interior of the machine. This frame is provided upon each side upon its outer face with grooves or guideways in which is adapted to normally slide a plate $S^2$ for closing the openings S' when the machine is in operation. When it is desired to clean the machine, the slide or plate $S^2$ is removed and a trough-shaped receiver T is inserted in its stead, which will receive the cleanings, and this receiver can then be removed and emptied and the slide $S^2$ again inserted.

In Figs. 8 and 9 we have shown a modified form of construction, and in these views the screen is shown oval. In this form we do away with the rotary brush and utilize a drag-brush instead. U represents the drag-brush, which is pivoted upon each side to one end of a link U'. The other end of the links is pivoted to hangers $U^2$, depending from the tube. Rollers or wheels V serve to hold the brush in the proper relation to the screen and roll upon the flanges C' and B', the same as described in the former construction. By utilizing the drag-brush we are enabled to do away with the gearing shown in the other construction, and then we do not need to provide the recess or offset $B^3$ in the plate B. In this latter construction we have also shown another means for cleaning off the tube G, which consists of a brush W, secured upon the ends of arms W', the other ends of the arms being pivoted to the disks C and B, so as to rotate with the same. Upon each end of the brush W is provided a roller X, which rollers are held in contact with cams Y by means of the springs $W^2$. This cam Y will hold the brush away from the feed-tube G until it is stopped, when the brush comes above the tube, and then the cam will allow the brush to descend and come in contact with the tube to brush off any flour lodging upon the same.

Of course we do not wish to be limited to the exact construction here shown, as slight modifications could be made without departing from the spirit of our invention.

Having thus fully described our invention, what we claim as new and useful is—

1. In a flour-sifting machine, a horizontal power-shaft, two vertical disks arranged a distance apart, one of the disks being secured to the power-shaft, means for securing the disks together so as to cause them to revolve in unison, a horizontal flange formed around the periphery of each of the disks and extending inward, a screen secured around said flanges and extending between the disks, an opening formed through the screen, a slide for normally closing said opening, a feed-tube extending to the interior of the machine through one of the disks, a hopper opening into the feed-tube and located outside of the disks, a screw conveyer arranged within the tube and connected to the power-shaft so as to revolve therewith, the tube being provided with an opening upon its under side in the interior of the machine, a gear-wheel secured to the power-shaft upon the interior of the machine, a stationary casing inclosing said gear-wheel and being secured to the inner end of the feed-tube, a gear-wheel in mesh with the first-named gear-wheel and located underneath the same, an elongated casing pivoted at one end coincident with the lower gear-wheel and making a dust-tight joint with the first-named casing, a train of gears located within the elongated casing extending from the lower gear, a transverse shaft journaled in the outer end of the elongated casing and secured to the last gear of the train, a hanger depending from the stationary feed-tube upon the opposite side of the machine, a link pivoted at one end to the lower end of the hanger, the transverse shaft being journaled in the other end of the link, a circular brush secured to the shaft and adapted to come in contact with the screen by gravity, rollers or wheels journaled loosely upon the shaft and adapted to roll upon the horizontal flanges of the disk, and means for automatically removing flour lodging upon the upper surface of the feed-tube, as and for the purpose specified.

2. In a flour-sifting machine, a horizontal power-shaft, two disks arranged a distance apart and adapted to revolve with the power-shaft, inwardly-extending horizontal flanges formed at the periphery of the disks, a screen extending around the horizontal flanges and between the disks, a stationary feed-tube extending into the interior of the machine, a hopper connected to the feed-tube upon the outside of the machine, a screw conveyer arranged within the tube and connected with the power-shaft, the tube being provided with openings in its lower side upon the interior of the machine, a brush adapted to lie in contact with the screen by gravity, rollers or wheels journaled upon each side of the brush and adapted to roll upon the horizontal flanges of the disk, hangers depending from the feed-tube upon each side, links pivoted at one end to the lower end of the hangers and at the other end to the brush, and means for automatically removing flour lodging upon the upper surface of the feed-tube, as and for the purpose specified.

In testimony whereof we have hereunto affixed our signatures in the presence of two ubscribing witnesses.

CARL P. P. GRAVÉ.
    JOHN SCHAIBLE.

Witnesses:
 C. E. BEIDELMAN,
 F. H. RICE.